3,354,143
PROCESS FOR PREPARING FERULATES FROM ALKALI FOOTS OF VEGETABLE OILS
Minoru Takubo, Funabashi, Koichi Tachibana, Suginami-ku, Tokyo-to, and Shuji Watanabe, Nakanoku, Tokyo-to, Japan, assignors to Toyo Koatsu Industries, Incorporated, Chuo-ku, Tokyo-to, Japan, a corporation of Japan
No Drawing. Filed Sept. 4, 1963, Ser. No. 306,615
Claims priority, application Japan, Sept. 22, 1962, 37/40,926
4 Claims. (Cl. 260—236.5)

This invention relates to a process for preparing valuable ferulates from the alkali foots of vegetable oils. More particularly the present invention relates to a process for preparing gamma-oryzanol from the alkali foots of rice bran oil.

It has recently been found that rice bran oil is very high in nutrient value. The consumption of rice bran oil has recently increased among edible oils, but the quantity is still small. The cause of this is said to be that rice bran oil contains such a large amount of free fatty acid that alkali foots which are produced by alkali refinement are so large in quantity as to be difficult to treat. However, such alkali foots contain glyceride and many other useful substances. As a result of investigating the recovery of such useful substances from alkali foots, we discovered a process for separating medicinal ferulates such as, specifically, gamma-oryzanol.

Alkali foots of rice bran oil contain ferulates, i.e., esters of ferulic acid, which are useful as medicines and many reports have been made on their medicinal effects. Thus, such ferulates as beta-sitosterol and cycloartenol are known to be obtainable from rice bran oil.

Especially, it is known that gamma-oryzanol which has a characteristoc maximum ultraviolet absoprtion of 216, 231, 291 and 315 m$\mu$ and which is considered to be a kind of ferulates has a high growth accelerating action for anomals, and is an effective ingredient having a close relationship with their breeding. Such ferulates are also known to have actions similar to hormones and vitamins on animals. The amount of ferulates present in alkali foots of rice bran oil is so small that, in separating ferulates from alkali foots, there has been adopted a method wherein alkali foots are converted to a dark oil, the dark oil as it is, or as esterified, is distilled and the thus-obtained distillation residue, from which the fatty acid, or ester, has been distilled away and which contains concentrated ferulates, is treated with an organic solvent containing an alkali. Also, there has been known heretofore the method wherein alkali foots are converted to a dark oil is then converted to a metallic soap and the metallic soap is dehydrated and is then treated with a polar organic solvent.

The above-mentoned prior method of extracting ferulates from the distillation residue has an advantage that the concentration of the ferulates is sufficiently high that the extraction is easy but it has the disadvantage that the concentrating step is so complicated that the ferulates are decomposed and lost and the oil component is polymerized. Such polymerized oil is deposited together with the ferulates and decreases the purity and yield of the ferulates. Therefore, in a method of collecting the ferulates from the distillation residue, a step for separating the polymerized oil is necessary. This operation is generally carried out by the variation of pH. But, the pH at which the polymerized oil deposits is so different depending on the raw material that a highly skilled technique is required and the quality of the ferulates fluctuates considerably depending on the degree of removal of polymerized oil and is difficult to keep constant.

Therefore, if medicinally effective ferulates are prepared directly from alkali foots, there is the advantage of requiring no concentrating steps, there is no adverse influence due to impurities, the process is remarkably simplified and the quality of the product fluctuates very little. Furthermore, in such case, since the soap and oil components in the alkali foots can be readily separated from each other, it would be possible to utilize the oil component in other fields.

An object of the present invention is to provide an improved method of separating ferulates from alkali foots of vegetable oils, especially separating gamma-oryzanol from alkali foots of rice bran oil, in high yield and high purity.

Another object of the present invention is to provide a simplified method of separating ferulates from alkali foots of vegetable oils.

Considerable amounts of water and soap components are contained in alkali foots and have an obstructing action on the preparation of ferulates. Therefore, in the method of the present invention, first of all, water and soap components are removed as much as possible from the alkali foots by treating at room temperatures, or by warming the alkali foots, with an organic solvent selected by a group consisting of methanol, ethanol and acetone. It is preferable to use an amount of solvent from 1 to 6 times as large as the amount of the foots by volume. The use of an amount of the solvent outside this range decreases the yield of ferulates and, thus, is not desirable. It is also preferable to employ a temperature of 20 to 40° C. The residue of leaching with such a water-soluble organic solvent is then subjected to extraction at room temperatures with such water-soluble organic solvent as methanol, ethanol or acetone containing alkaline substance. As alkaline substance, the alkali metal hydroxides, carbonates and bicarbonates, especially NaOH, KOH, $Na_2CO_3$, $NaHCO_3$, $K_2CO_3$, $KHCO_3$, are desirable. In such a case, the organic solvent should not contain water; but, if an organic solvent containing less than 10% water is used, there is no great trouble. An extraction with heat can be carried out, but, as a result, the extract is usually emulsified and difficult to separate. Temperatures in the range of 20 to 40° C. are preferred. Furthermore, if the alkali concentration is too high, the extract is emulsified and the purity and yield of ferulates decreases. Therefore, the alkali concentration of the extracting solution should be less than about 0.5 N, specifically about 0.3 to about 0.1 N and the amount of extracting solution is preferable from 2 to 10 times the weight of said residue.

When the thus-obtained extract is neutralized with a weak acid, crystals of ferulates are precipitated. If mineral acid is used, the ferulates are decomposed or impurities are deposited. So, a weak acid is used, especially an organic monocarboxylic acid, such as acetic acid, is desirable. Since a water solution cannot be used in this neutralization, an organic solvent solution 30 to 80 weight percent of the acid is used. Organic solvent such as methanol, ethanol, and acetone, are desirable for this purpose.

It is preferable that the neutralization should adjust the pH to be 6 to 9, because the ferulates are decomposed on the acid side.

The method of this invention is different from the above-mentioned cases of preparing ferulates from vegetable oils, in that any impurities dissolved in the extract are so low that the extract can be neutralized simply with an acid and ferulates high in purity and precipitated without requiring any impurity separating steps. The precipitated ferulates as thus obtained by the present invention can be used in various applications as is, since its quality is constant.

Further, the organic solvent is recovered by distillation of the organic solvent solution from which the ferulates have been precipitated and of the initial extract from which water and the soap components have been separated. The resulting residue is then refined by washing with water and salting out. The soap component is thus separated and there remains a neutral oil component which is usable in the manufacture of edible oils.

The method of this invention can be applied by the same operation to not only rice bran oil but also to any of such vegetable oils containing ferulates as corn oil, rice bran oil, rice embryo oil, wheat embryo oil, rape oil and linseed oil.

An example of the present invention is given in the following:

EXAMPLE 200 ml. of methanol were added to 50 g. of the alkali foots of rice bran oil having a saponification value of 54.7 and ferulates content of 3.5%. The mixture was stirred at room temperature for 30 minutes and was then filtered. 200 ml. of a methanol solution containing 0.5% KOH on a weight basis were added to the extraction residue. The mixture was stirred at room temperature for 30 minutes and 11.4 g. of an extraction residue containing a brown oil component and composed mostly of soap were separated by filtration. When a 50 weight percent solution of acetic acid dissolved in methanol was then added to the filtrate to adjust the pH to 6.0, 0.65 g. of a white crystal was obtained. This crystal contained 97.5% ferulates (gamma-oryzanol) and the yield of the ferulates was 36.5%. In order to obtain a product of a higher purity, the precipitate was recrystallized or chromotographed by usual method.

The methanol was recovered by distillation from the first methanol extract and also from the extract from which the ferulates had been separated. After the resulting residue was then water-washed and salted out to separate the accompanying soap components, 6.0 g. of an oil component having an acid value of 0.6 and a saponification value of 170 remained. The oil component was usable as a raw material for the manufacture of edible oils.

What is claimed is:

1. Process for obtaining a therapeutically active extract from alkali foots obtained by alkali-refining vegetable oils containing ferulates comprising leaching said alkali foots at a temperature of about 20° to 40° C. with one to six times the volume of said alkali foots of a leaching solvent selected from the class consisting of methanol, ethanol and acetone to remove water and soap components and leave a residue at a temperature of about 20° to 40° C.; extracting said residue with a substantially non-aqueous extracting solution of an alkaline substance from the class consisting of an alkali metal hydroxide, an alkali metal carbonate and an alkali metal bicarbonate in an amount of not more than 0.5 N in a solvent from the class consisting of methanol, ethanol and acetone, said solvent containing less than 10% water; and neutralizing the resulting extract with a non-aqueous solution of a monocarboxylic acid to a pH of 6.0 to 9.0, thereby precipitating said therapeutically active extract.

2. The process as claimed in claim 1 wherein said extracting solution contains 0.1 to 0.3 N of said alkaline substance.

3. The process as claimed in claim 1 wherein said leaching solvent is methanol, said extracting solution is potassium hydroxide dissolved in methanol and said monocarboxylic acid is acetic acid.

4. The process as claimed in claim 1 wherein said leaching solvent and said extracting solvent are recovered by distillation and the residue resulting from said distillation is washed with water and salted out to separate soap components and leave an oil component usuable for the manufacture of edible oils.

References Cited

Tsuchiya et al. (Japanese Patent) 1149 (1958) (2 pages).

JAMES A. PATTEN, *Primary Examiner.*

N. RIZZO, *Examiner.*